Patented Oct. 17, 1950

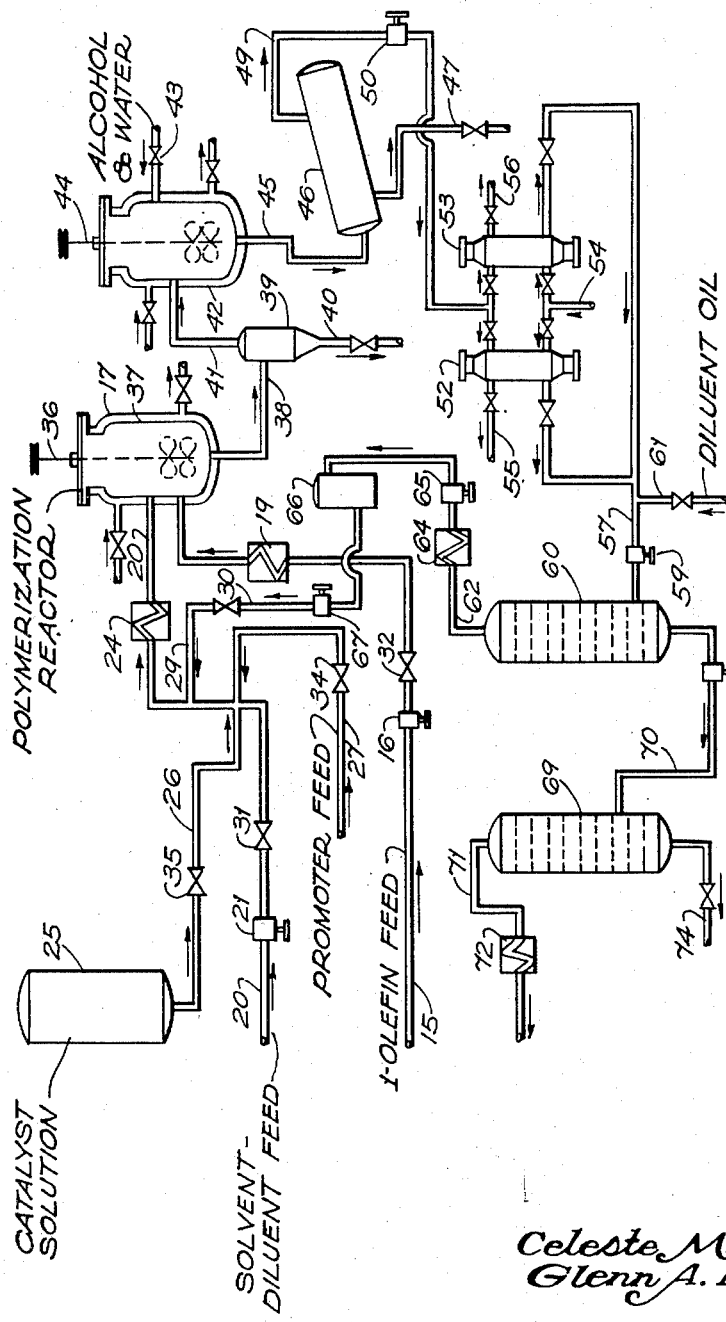

2,525,788

UNITED STATES PATENT OFFICE

2,525,788

MINERAL OIL LUBRICANTS CONTAINING POLYMERS OF 1-OLEFINS

Celeste M. Fontana, Pitman, N. J., and Glenn A. Kidder, Harbel, Liberia, assignors, by mesne assignments, to Socony-Vacuum Oil Company, Incorporated, New York, N. Y., a corporation of New York Application August 11, 1948, Serial No. 43,724

18 Claims. (Cl. 252—59)

This invention relates to polymerization of olefins and relates more particularly to the polymerization of 1-olefins to produce highly viscous polymer products. The present application is a continuation-in-part of application Serial No. 698,730, filed September 23, 1946, now abandoned.

It is known that the branched chain olefin, isobutene, may be polymerized in the presence of suitable metal halide catalysts, particularly boron fluoride, with or without the assistance of catalyst promoting agents such as the hydrogen halides, to produce polymer products ranging in viscosity from very light liquids and light lubricating oils to rubbery semi-solids. The viscosity of the product has been found to depend upon the temperature at which the polymerization reaction is carried out, the light products being obtained at room temperature and higher and the heavier products being obtained at temperatures of the order of $-40°$ C. and lower, for example, $-80°$ C. or even $-100°$ C. The heavier products obtained, i. e., those of very high viscosity bordering upon a semi-solid nature, and even those having rubbery characteristics, have been found to be highly useful as additives or blending agents for admixture with natural mineral oil base stocks to improve their viscosity characteristics, particularly their viscosity indices. Attempts to produce a highly viscous polymer suitable as a viscosity and viscosity index improving blending agent from 1-olefins containing four or more carbon atoms heretofore have not been successful. By 1-olefins containing four or more carbon atoms, we mean any olefin containing four or more carbon atoms where the double bond is on a terminal carbon atom and no more than one alkyl substituent is on the carbon atom once removed from the terminal carbon atom. These olefins have the general formula, $R—CH=CH_2$, where R is an alkyl group containing at least two carbon atoms. While viscous polymers may be produced from these olefins, the polymers obtained are not comparable with those obtained from isobutene because their viscosity indices or viscosity index improving qualities are insufficiently high to result in satisfactory improvement in the viscosity index of the base stock.

It is an object of this invention to provide an improved process for the polymerization of 1-olefins containing four or more carbon atoms. It is another object of this invention to provide highly viscous and semi-solid polymer products from 1-olefins containing four or more carbon atoms. It is another object of this invention to provide blending agents from 1-olefins containing four or more carbon atoms which have novel and improved viscosity and viscosity index improving qualities. It is another object of this invention to provide polymer products from 1-olefins containing four or more carbon atoms which have novel and improved thickening powers. Further objects of the invention will become apparent from the following description thereof.

In accordance with the invention, 1-olefins containing four or more carbon atoms are polymerized in high yield by a process which comprises contacting the olefin with aluminum bromide catalyst dissolved in a nonpolymerizing hydrocarbon solvent in the presence of a catalyst promoting agent under selected and correlated reaction conditions. While we are aware that 1-olefins have been polymerized in the presence of a nonpolymerizing hydrocarbon, aluminum bromide catalyst, and a catalyst promoting agent, we have discovered that, by carrying out the polymerization reaction under selected and correlated reaction conditions, the desired high viscosity and semi-solid polymers can be obtained. Our invention is characterized in that the 1-olefin polymer products obtained will have thickening powers at 210° Fahrenheit above 5 and as high as 23.

In setting forth the characteristics of the 1-olefin polymer products of the invention, we have found it useful to employ the concept of thickening power and relative thickening power since, at high viscosities, the concepts of viscosity and viscosity index are no longer satisfactory due to the difficulty or impossibility of directly measuring viscosities. By thickening power of the 1-olefin polymers, we mean the relationship expressed by the equation $$TP = \frac{100}{\% \text{ polymer in blend}} \log_{10} \frac{\text{kinematic viscosity of oil blend}}{\text{kinematic viscosity of base oil}}$$

where:

"TP" is the thickening power;
"% polymer in blend" is the percent by weight of the polymer blended with a base stock lubricating oil;
"Kinematic viscosity of oil blend" is the viscosity in centistokes of the blend of base stock lubricating oil and polymer; and
"Kinematic viscosity of base oil" is the viscosity in centistokes of the base stock lubricating oil.

By $TP_{210}$ and $TP_{100}$, we mean the thickening power, as defined above, where the viscosities of the blends and the base stock lubricating oils are measured at 210° F. and 100° F., respectively. By relative thickening power, we mean the ratio of the thickening powers measured at 210° F., and 100° F., expressed mathematically as $$RTP = \frac{TP_{210}}{TP_{100}}$$

where "RTP" is relative thickening power.

The thickening power is closely related to intrinsic viscosity and is a measure of the molecular weight and viscosity of the polymer. Relative thickening power is closely related to viscosity index and is a measure of the change in viscosity with change in temperature. It will be realized that those polymers having larger values of relative thickening power will be superior with respect to change in viscosity with temperature.

Our invention is predicated on our discovery that polymers having high thickening powers may be obtained by employing selected and correlated reaction conditions within specified limits. We have discovered that the ratio of promoter to aluminum bromide catalyst is an important variable, and that a definte minimum ratio is required in order to obtain the products of high thickening power. An excess of promoter over this required minimum ratio may be employed but we have discovered that, as the ratio of promoter to aluminum bromide catalyst is increased, the thickening power of the polymer begins to decrease. Preferably, we do not employ more than 1.6 moles of catalyst promoter per mole of aluminum bromide catalyst. However, it is essential that at least 0.05 mole of catalyst promoter per mole of aluminum bromide catalyst be employed. Preferably, we employ a ratio of between about 0.08 and 1.2 moles of catalyst promoter per mole of aluminum bromide catalyst.

We have discovered additionally that the high thickening power polymers are obtained only when the instantaneous 1-olefin monomer concentration in the reaction mixture is maintained at a low value. Since the rate at which the 1-olefin polymerizes, and therefore the amount of 1-olefin monomer in the reaction mixture at any one time, is not readily ascertainable, we prefer to express this concentration in terms of the rate at which the 1-olefin is added to the reaction mixture containing diluent, promoter, and aluminum bromide catalyst. We have discovered that it is necessary to employ a rate of addition of 1-olefin not greater than 4.0 moles per mole of aluminum bromide catalyst per minute. For polymers of very high thickening power, we prefer to employ a rate of addition not greater than about 2.5 moles per mole of aluminum bromide catalyst per minute. Where higher rates of addition are employed, polymer products of inferior thickening power are obtained. It is believed that the effect of rate of addition is not due to incomplete polymerization of olefin, since the polymerization reaction is essentially complete in less than one minute with essentially 100% conversion to polymer product of desired thickening power. While we do not wish to be limited to the consequences of any theory, the effect is believed to be due to a chain transfer reaction with monomeric olefin resulting in low molecular weight products when the instantaneous 1-olefin monomer concentration is high.

Another variable we have found to be of significance is the olefin to catalyst ratio, i. e., the total amount of 1-olefin polymerized per unit amount of aluminum bromide employed. We have discovered that 1-olefin polymers having high thickening powers may be obtained by employing olefin to catalyst ratios in excess of 5 moles of olefin per mole of aluminum bromide catalyst. Preferably, however, we employ higher ratios of olefin to catalyst in order to obtain maximum utilization of the catalyst, for example, ratios of olefin to catalyst between 10 and 90 moles of olefin per mole of catalyst. Further, we prefer to employ ratios not in excess of about 90 moles of olefin per mole of catalyst, since above these values the thickening powers of the 1-olefin polymer products obtained decrease. Most satisfactory results are obtained with ratios between 20 and 75 moles of olefin per mole of catalyst.

The temperature at which the polymerization reaction is carried out affects the thickening power of the polymer product and we have discovered that, contrary to general belief, the viscosity and molecular weight, and consequently the thickening power, do not increase with decreasing temperature of reaction, but increase to reach a maximum value after which they decrease with decreasing temperature. The temperature at which this maximum value of thickening power of polymer product is obtained and the range of temperatures in which high values of thickening power of polymer product are obtained increase with increasing carbon content of the olefin monomer. For four carbon atom 1-olefin, i. e., 1-butene, polymers having high thickening powers are obtained at temperatures between about −10° C. and −45° C., and more particularly at temperatures between about −25° C. and −40° C., with the polymers of greatest thickening power being obtained at a temperature of about −35° C. For five carbon atoms 1-olefins, for example, 1-pentene, polymers having high thickening powers are obtained at temperatures between about 0° C. and −40° C., and more particularly at temperatures between about −15° C. and −35° C., with the polymers of greatest thickening power being obtained at about −30° C. For 1-olefins containing eight or more carbon atoms, for example, 1-octene and higher olefins, polymers of high thickening power are obtained at temperatures between about +20° C. and −35° C., and more particularly at temperatures between about 0° C. and −30° C., with the polymers of greatest thickening power being obtained at about −20° C.

It will be obvious to those skilled in the art that, in order to obtain a 1-olefin of a desired specified thickening power, selection and correlation of the reaction variables within the limits set forth above will be made. Thus, where 1-olefin polymer products have thickening powers at 210° F. of 23 are desired, the most favorable values for the reaction variables will be selected. Where 1-olefin polymer products of lesser thickening power are desired, the most favorable value for one or more of the variables may be selected with less favorable values for the other variables being selected. Alternatively, less favorable values for all of the variables may be selected to obtain 1-olefin polymer products of a specified lesser thickening power. The selection and correlation of these variables is within the skill of those versed in the art in the light of the discussion contained herein.

The process of the invention may be applied to any 1-olefin as hereinbefore defined. Examples of such 1-olefins are 1-butene, 1-pentene, 1-hexene, 1-heptene, 1-octene, and other 1-olefins up to and including those containing 20 or even 30 carbon atoms. Preferably, however, 1-butene, 1-pentene, and 1-octene are employed. With respect to the general formula, $R—CH=CH_2$, R will contain two carbons atoms in the case of 1-butene, R will contain three carbon atoms in the case of 1-pentene, etc.

1-butene and 1-pentene may be suitably obtained from $C_4$ and $C_5$ refinery streams. Higher molecular weight olefins may be suitably obtained by dehydration of the corresponding alcohol or may be obtained from cracking still gases, Fisher-Tropsch cuts, etc. Mixtures of 1-olefins may also be employed, and the 1-olefin stream may contain saturated hydrocarbons. It is desirable to employ the 1-olefins as free as possible of isoparaffins, olefins containing two alkyl groups on the carbon atom once removed from the terminal carbon atom, and 2-olefins, since the presence of these compounds tends to reduce the thickening power and the relative thickening power of the polymer product. Olefin streams containing up to a total of about 15% of these compounds, however, may be employed.

Included among olefins containing two alkyl groups on the carbon atom once removed from the terminal carbon atom is isobutene. While isobutene may be polymerized by other processes to produce polymer products of high viscosity, the present process, as applied to isobutene, does not produce a polymer of high thickening power, producing rather, a light oil. Further, these other processes producing a high viscosity polymer from isobutene, when applied to the polymerization of 1-olefins, do not produce a polymer of high thickening power, but produce, rather, a light oil.

The concentration of dissolved aluminum bromide in the nonpolymerizing hydrocarbon solvent should be sufficiently high to catalyze the polymerization reaction. An upper limit to catalyst concentration, however, may be governed by the olefin-catalyst ratio, i. e., at high olefin-catalyst ratios, large amounts of 1-olefins will be added to the reaction mixture containing a high concentration of dissolved aluminum bromide thereby providing a highly viscous mixture which is difficult to handle during the later operations of clarification, solvent recovery, etc. Preferably, we employ a catalyst concentration, based upon the total nonpolymerizing hydrocarbon in the reaction mixture, of between 0.1 and 1.5 mole per cent. However, it will be understood that the maximum concentration of aluminum bromide that may be employed will be limited only by the solubility of the aluminum bromide in the hydrocarbon at the temperature employed.

In carrying out the invention, we prefer to employ hydrogen bromide as the catalyst promoting agent. However, bromo-alkanes containing at least three carbon atoms, such as propyl, isopropyl, butyl, isoamyl, etc., bromo-alkanes may be employed. Also, compounds which react under the conditions of the polymerization reaction, for example, by reaction with aluminum bromide to produce hydrogen bromide are also effective. The mechanism of the catalyst promoting effect of the bromo-alkanes is not well understood, although it appears that, since aluminum bromide is known to catalyze the dehydrobromination of bromo-alkanes, dehydrobromination of the bromo-alkanes may occur to form olefins and hydrogen bromide, the hydrogen bromide thereupon acting as the effective promoter. However, at low temperatures, equilibria do not favor dehydrobromination, and, at these temperatures it is possible that the promoting effect may be due to co-polymerization of the bromo-alkanes to produce a polymer and hydrogen bromide. It is also possible that the bromo-alkanes are in themselves promoting agents, and, where hydrogen bromide is employed as the promoter, a bromo-alkane is formed by reaction of the hydrogen bromide and the 1-olefin which thereupon acts as the effective catalyst promoting agent. When employing bromo-alkanes, the mole ratio of these compounds to dissolved aluminum bromide will be the same numerically as where hydrogen bromide is employed, although if compounds which react under the conditions of the polymerization reaction to produce hydrogen bromide are employed, an amount will be used which will give the desired ratio of promoter, measured as hydrogen bromide, to aluminum bromide catalyst.

It is possible to carry out the reaction either as a batch reaction or as a continuous reaction. In batch operation, the 1-olefin may be added to the reaction vessel containing the dissolved aluminum bromide plus the proper amount of promoter. In this type of operation, the reaction vessel will contain a known amount of dissolved aluminum bromide and the 1-olefin may be added thereto at the desired rate. In continuous operation, the 1-olefin and the dissolved aluminum bromide, plus the proper amount of promoter in admixture with the 1-olefin or as a separate stream, are added simultaneously to the reaction vessel, and a stream of reaction mixture is removed continuously therefrom. In the latter type of operation, the reaction vessel will be filled with reaction mixture and, for any given ratio of rates of flow of the respective streams thereto, will contain a known quantity of dissolved aluminum bromide. Thus, suitable adjustment of the rates of flow of the respective streams will result in addition of 1-olefin to the reaction vessel at the desired rate with respect to the amount of aluminum bromide.

The catalyst solution may be prepared by dissolving the aluminum bromide in any suitable type of non-polymerizing hydrocarbon solvent. Examples of suitable hydrocarbon solvents are the saturated hydrocarbon solvents such as ethane, propane, normal butane, etc. Mixtures of one or more solvents may also be employed, if desired, for preparing the catalyst solution.

It is preferred to carry out the polymerization reaction in the presence of a diluent for the 1-olefin. The saturated hydrocarbons employed as solvents for the aluminum bromide are satisfactory as diluents. If desired, mixtures of hydrocarbons may be used as diluents.

In both batch and continuous operation, one type of hydrocarbon may be employed as diluent and another type of hydrocarbon may be employed as solvent for the aluminum bromide, or a mixture of two or more hydrocarbons may be employed as diluent and as solvent. However, it will be more convenient to employ the same single hydrocarbon as diluent and as solvent, particularly in large scale operations, in order to simplify the later procedures of recovering the diluent and solvent for reuse. In the case of low temperature polymerization, on the other hand, it may frequently be advantageous to use a solvent of moderate volatility, such as normal butane, to dissolve the catalyst and a highly volatile diluent, such as ethane, capable of use for evaporative cooling, to control the temperature of the polymerization reaction mixture. The catalyst solution may be added to part or all of the diluent, whether or not the same type of hydrocarbon is used as solvent and as diluent, and the mixture will serve in the capacity of both catalyst solution and diluent.

The amount of nonpolymerizing hydrocarbon to be employed as solvent and as diluent may be the same as conventionally employed in olefin polymerization reactions. We may use nonpolymerizing hydrocarbon in the amount between about 3 and 8 moles per mole of 1-olefin. However, larger or smaller ratios may be employed as desired.

In carrying out the polymerization reaction, the feed streams, before being charged to the reactor, are preferably brought to the desired reaction temperature. The polymerization reaction is exothermic, and the reaction mixture may be maintained at the desired temperature by means of external heat exchangers as, for example, by employing a jacketed reaction vessel or heat exchanger coils within the reaction vessel through which suitable refrigerants may be passed. If desired, evaporative cooling may be employed.

Pressures to be employed should be sufficient to keep the solvent and diluent in the liquid phase at the particular temperature of polymerization selected. The 1-olefin may be admitted to the reactor in either the gaseous phase or the liquid phase.

Following polymerization, the reactor effluent may be treated by any suitable procedure for removal of catalyst tar, if tar is present, and dissolved catalyst. For example, catalyst tar, if present, may be removed by settling. The reactor effluent may then be treated with water, alkali, alcohol, etc., to inactivate the aluminum bromide after which the reaction products of the dissolved aluminum bromide and the inactivating agent may be removed by washing, filtering, or other suitable means. It is desirable to clarify the reaction products and this may be effected with a clay such as bentonite. Following clarification, the reaction effluent may be subjected to fractionation, steam distillation, gas stripping, or other suitable procedure to remove solvent, diluent, and any light hydrocarbon reaction products or light polymer products from the desired polymer product. Where fractionation is employed to remove from the desired polymer product any light polymer products that may be formed, low pressure may be used to obtain effective separation without the use of high temperatures conducive to cracking of the desired polymer product. Temperatures not above about 350° C. are satisfactory, and the pressure within the apparatus may be progressively decreased, as the fractionation proceeds, to a pressure of about one millimeter of mercury at the end of the fractionation operation. However, effective separation of light polymer products may be effected by heating and flushing with an inert gas such as nitrogen.

Hydrogen bromide or other promoter contained in the polymerization reaction effluent will be removed during treatment for removal of aluminum bromide catalyst. Should any promoter remain in the reaction effluent it will be largely removed during fractionation or otherwise for the removal of solvent, diluent, or light hydrocarbon reaction products. Fractionation, or gas flushing, for removal of light polymer products from the desired polymer product will remove any traces of promoter not previously removed.

Where the polymer products are to be employed as blending agents or otherwise employed in admixture with a hydrocarbon oil, a hydrocarbon oil may be admixed with the reaction effluent prior to removal of solvent and diluent in order to facilitate handling of an otherwise highly viscous or semi-solid product.

While the products of the invention may be used for various purposes, they are particularly useful as viscosity index improving agents for mineral lubricating oils. The polymer products of the invention are characterized by their ability to produce blends having viscosity indices between 130 and 150 where the base stock has a viscosity index between about 110 and 120. Where the base stock has a lower viscosity index, a greater proportionate increase in the viscosity index of the blend will be obtained.

The accompanying drawing is a flow sheet schematically illustrating one method of carrying out the polymerization reaction.

Referring now to the drawing, 1-olefin feed enters the system through line 15 and is pumped by means of pump 16 to polymerization reactor 17. Before entering the polymerization reactor, the 1-olefin feed passes through heat exchanger 19 where it is heated or cooled to the desired reaction temperature. The solvent-diluent feed enters the system through line 20 and is pumped by means of pump 21 to the polymerization reactor 17, being heated or cooled to the desired reaction temperature before entering the reactor by passage through heat exchanger 24.

Aluminum bromide catalyst dissolved in a saturated hydrocarbon solvent enters polymerization reactor 17 from reservoir 25 through line 26 connected to solvent-diluent feed line 20.

Hydrogen bromide promoter is fed to the system through line 27 connected to line 20. Recycle solvent-diluent obtained in the manner to be hereinafter described enters line 20 through line 29 and passes into polymerization reactor 17. Line 29 is provided with flow control valve 30 and solvent-diluent feed line 20 is provided with flow control valve 31 for control of the solvent-diluent entering the reactor 17. Olefin feed line 15 is provided with flow control valve 32, hydrogen bromide feed line 27 is fitted with flow control valve 34, and aluminum bromide line 26 is fitted with flow control valve 35. By suitable manipulation of these flow control valves, the proper ratio of hydrogen bromide to aluminum bromide, the desired concentration of aluminum bromide, and the proper rate of 1-olefin feed to aluminum bromide concentration is obtained in the polymerization reactor 17.

The solvent-diluent feed containing the dissolved aluminum bromide and hydrogen bromide is intimately mixed with the 1-olefin in the reactor 17 by means of stirrer 36. To maintain the reactants at the desired polymerization temperature, a suitable heat transfer medium is conducted through jacket 37.

The polymerization reaction products are withdrawn from the reactor 17 through line 38 and are passed to settler 39 wherein any tar formed during the polymerization reaction settles to the bottom, from which it may be withdrawn through line 40. If desired, the tar may be sent to a recovery system (not shown) for recovery of aluminum bromide.

The polymerization reaction mixture leaves the top of the settler 39 through line 41 and is passed to mixing vessel 42 where it is admixed with a solution of alcohol and water entering the vessel through line 43. To assist in admixture of the polymerization reaction mixture and the solution of alcohol and water, vessel 42 is provided with stirrer 44. Vessel 42 is also jacketed whereby any undesired change in temperature of the polymerization reaction mixture upon reaction with the alcohol and water may be prevented. The mixture leaves vessel 42 through line 45 and enters settler 46 where the alcohol and water separate from the hydrocarbon reaction mixture. The heavier alcohol and water phase is removed from the settler through line 47 and may be passed to a recovery system (not shown) for recovery of alcohol, water, and bromine.

The hydrocarbon reaction mixture leaves the top of the settler through line 49 and is pumped by means of pump 50 through clay chambers 52 and 53 for clarification. Chambers 52 and 53 are connected in parallel and provided with suitable valves in order that continuous operation may be obtained by leaving one chamber on stream while the other chamber is taken off stream for refilling or for regeneration of the clay. Steam or other medium for regeneration of the clay may enter through line 54 and leaves chambers 52 and 53 through lines 55 and 56, respectively.

The clarified products from the clay chambers pass through line 57 and are pumped by means of pump 59 to fractionation column 60. Where the polymer products are to be employed subsequently in admixture with a hydrocarbon oil, a light hydrocarbon oil may be admixed with the reaction products from line 61 connected to line 57. The solvent-diluent and any catalyst promoter are removed as overhead from fractionation column 60 through line 62. The overhead passes through condenser 64 wherein the solvent-diluent is condensed and the condensate is pumped by pump 65 to receiver 66. From receiver 66, the solvent-diluent is pumped by pump 67 through line 29 to line 20 for recycle to the polymerization reactor 17. The recycle solvent-diluent may contain some hydrogen bromide which enters the polymerization reactor in addition to the hydrogen bromide fed through the reactor from line 27. Accordingly, this amount of hydrogen bromide must be taken into account when controlling the amount of hydrogen bromide fed from line 27 to obtain the desired ratio of hydrogen to aluminum bromide.

The bottoms from fractionation column 60 comprise the desired polymer product and any light polymer products formed during the reaction. The bottoms are transferred to fractionation column 69 through line 70 where the light polymer products are removed as overhead through line 71 and condensed in condenser 72, to be utilized as desired. The desired polymer products is removed as bottoms from column 69 through line 74.

The above described procedure is susceptible of various modifications. For example, in place of employing the clay chambers 52 and 53, the polymerization reaction products in line 49 may be clarified by admixing with clay and thereafter filtering the clay therefrom. Additionally, if desired, the polymerization products issuing as bottoms from the fractionation column 60 may be steam distilled, gas flushed, or otherwise treated for removal of any light polymer products. These and other modifications are possible, and they, as well as the necessary provision of apparatus and lines, may readily be made by those skilled in the art.

Our invention will be further illustrated by the following examples:

EXAMPLES 1 TO 7

In these examples, 1-butene was polymerized by passing 1-butene, aluminum bromide catalyst dissolved in liquid normal butane, and hydrogen bromide promoter continuously to a reaction vessel provided with a cooling coil and a stirrer. The three streams were brought to reaction temperature prior to entering the reactor. The runs were made at various temperatures, but the other reaction conditions were constant for each example and were as follows:

Ratio of promoter to catalyst—1.0 mole of HBr per mole of $AlBr_3$.
Ratio of olefin to catalyst—50 moles of 1-butene per mole of $AlBr_3$.
Rate of addition of olefin—0.83 mole of 1-butene per mole of $AlBr_3$ per minute.

A stream of reaction effluent was removed continuously from the reactor and admixed with isopropyl alcohol and water to react with the aluminum bromide catalyst. The hydrocarbon phase of the mixture was separated from the alcohol-water phase and thereafter the butane solvent was evaporated from the hydrocarbon phase. The final polymer product was obtained as bottoms by fractionating the hydrocarbon phase at a top temperature of 150° C. and a pressure of 3 mm. of mercury. The final polymer products were obtained, as in all the other examples appearing hereinafter, in a yield of at least 98% of the 1-butene charged to the reactor.

The polymer products were admixed in an amount of 2% by weight with a neutral lubricating oil base stock having a viscosity at 210° F. of 5.08 centistokes and a viscosity index of 113. The viscosities of the blended oils were determined at 100° F. and 210° F., and the thickening powers calculated from the expressions given hereinabove.

Table I lists the temperatures of polymerization, the viscosities and viscosity indices of the blends, and the thickening powers of the polymer products.

Table I

| Example No. | Temperature °C. | Viscosity of Blend | | Viscosity Index of Blend | Thickening Power of Polymer | | Relative Thickening Power of Polymer |
| --- | --- | --- | --- | --- | --- | --- | --- |
| | | Centistokes at 100° F. | Centistokes at 210° F. | | 100° F. | 210° F. | |
| 1 | −20 | 42.3 | 7.18 | 134 | 8.1 | 7.5 | 0.93 |
| 2 | −20 | 42.3 | 7.14 | 133 | 8.1 | 7.4 | 0.91 |
| 3 | −30 | 50.4 | 8.58 | 139 | 11.9 | 11.4 | 0.96 |
| 4 | −30 | 50.4 | 8.64 | 140 | 11.9 | 11.5 | 0.97 |
| 5 | −30 | 51.8 | 8.82 | 140 | 12.5 | 12.0 | 0.96 |
| 6 | −40 | 52.4 | 8.80 | 138 | 12.7 | 11.9 | 0.94 |
| 7 | −40 | 45.6 | 7.70 | 135 | 9.7 | 9.0 | 0.93 |

EXAMPLES 8 TO 15

In these examples, 1-butene was polymerized in the same manner as described in connection with the previous examples. However, in these examples, the ratio of promoter to catalyst was varied. The other reaction conditions were the same for each example and were as follows:

Temperature— —30° C.
Ratio of olefin to catalyst—50 moles of 1-butene per mole of AlBr$_3$.
Rate of addition of olefin—0.83 mole of 1-butene per mole of AlBr$_3$ per minute.

The thickening powers of the products were determined similarly as in the preceding examples.

The reaction conditions of promoter to catalyst, expressed as moles of hydrogen bromide per mole of aluminum bromide, the viscosities and viscosity indices of the blends, and the thickening powers of the polymer products are given in Table II.

*Table II*

| Example No. | Promoter Catlyst Ratio | Viscosity of Blend | | Viscosity Index of Blend | Thickening Power of Polymer | | Relative Thickening Power of Polymer |
|---|---|---|---|---|---|---|---|
| | | Centistokes at 100° F. | Centistokes at 210° F. | | 100° F. | 210° F. | |
| 8 | 0.10 | 48.8 | 8.36 | 139 | 11.2 | 10.8 | 0.96 |
| 9 | 0.29 | 57.6 | 9.90 | 142 | 14.8 | 14.5 | 0.98 |
| 10 | 0.50 | 55.8 | 9.55 | 141 | 14.1 | 13.7 | 0.97 |
| 11 | 0.53 | 57.1 | 9.68 | 141 | 14.6 | 14.0 | 0.96 |
| 12 | 1.00 | 51.8 | 8.82 | 140 | 12.5 | 12.0 | 0.96 |
| 13 | 1.00 | 50.4 | 8.64 | 140 | 11.9 | 11.5 | 0.97 |
| 14 | 1.00 | 50.4 | 8.58 | 139 | 11.9 | 11.4 | 0.96 |
| 15 | 1.50 | 40.8 | 6.91 | 132 | 7.3 | 6.7 | 0.92 |

EXAMPLES 16 TO 19

1-butene was polymerized similarly as in the preceding examples. The rates of addition of 1-butene were varied but the other reaction conditions were the same for each example as follows:

Temperature— —30° C.
Ratio of promoter to catalyst—0.40 mole of HBr per mole of AlBr$_3$.
Ratio of olefin to catalyst—50 moles of 1-butene per mole of AlBr$_3$.

The thickening powers of the polymer products were determined in the same manner as hereinabove described.

Table III gives the rates of addition of olefin, expressed as moles of 1-butene per mole of aluminum bromide catalyst per minute, and the viscosities and viscosity indices of the blends and thickening powers of the polymer products.

*Table III*

| Example No. | Rate of Addition | Viscosity of Blend | | Viscosity Index of Blend | Thickening Power of Polymer | | Relative Thickening Power |
|---|---|---|---|---|---|---|---|
| | | Centistokes at 100° F. | Centistokes at 210° F. | | 100° F. | 210° F. | |
| 16 | 3.33 | 41.1 | 6.94 | 132 | 7.4 | 6.7 | .90 |
| 17 | 1.67 | 48.9 | 8.26 | 137 | 11.2 | 10.5 | .94 |
| 18 | .83 | 52.0 | 9.05 | 140 | 12.9 | 12.5 | .97 |
| 19 | .56 | 52.2 | 8.85 | 139 | 12.6 | 12.0 | .95 |

EXAMPLES 20 TO 25

In these examples, butene-1 was polymerized in the same manner as described in the preceding examples. The olefin to catalyst ratio, i. e., the ratio of the amount of 1-butene to the amount of aluminum bromide catalyst, was varied but the temperature and the ratio of promoter to catalyst were the same for each example as follows:

Temperature— —30° C.
Ratio of promoter to catalyst—0.40 mole of HBr per mole of AlBr$_3$.

The rate of addition of olefin to catalyst was varied such that the entire amount of olefin was added to the polymerization reactor within sixty minutes. The thickening powers of the polymer products were determined as described hereinabove.

Table IV gives the ratio of olefin to catalyst, expressed as moles of 1-butene per mole of aluminum bromide, the rate of addition of olefin, expressed as moles of 1-butene per mole of aluminum bromide per minute, the viscosities and viscosity indices of the blends, and the thickening powers of the polymer products.

*Table IV*

| Example No. | Olefin to Catalyst Ratio | Rate of Addition of Olefin | Viscosity of Blend | | Viscosity Index of Blend | Thickening Power of Polymer | | Relative Thickening Power |
|---|---|---|---|---|---|---|---|---|
| | | | Centistokes at 100° F. | Centistokes at 210° F. | | 100° F. | 210° F. | |
| 20 | 20.0 | .33 | 47.1 | 8.06 | 138 | 10.4 | 10.0 | .96 |
| 21 | 28.4 | .47 | 49.6 | 8.44 | 138.5 | 11.5 | 11.0 | .96 |
| 22 | 28.4 | .47 | 49.6 | 8.44 | 138.5 | 11.5 | 11.0 | .96 |
| 23 | 33.0 | .55 | 52.4 | 8.97 | 140 | 12.7 | 12.3 | .97 |
| 24 | 50.0 | .83 | 52.9 | 9.05 | 140 | 12.9 | 12.5 | .97 |
| 25 | 75.0 | 1.25 | 41.6 | 6.99 | 132 | 7.7 | 6.9 | .90 |

EXAMPLE 26

In this example, 1-butene was polymerized under the following reaction conditions:

Temperature— —35° C.
Ratio of promoter to catalyst—0.24 mole of HBr per mole of $AlBr_3$.
Rate of addition of olefin—0.83 mole of 1-butene per mole of $AlBr_3$ per minute.
Ratio of olefin to catalyst—50 moles of 1-butene per mole of $AlBr_3$.

The thickening power of the polymer product was determined as in the preceding examples. The viscosities and viscosity indices of the blend and the thickening power of the polymer product are as follows:

Viscosity of blend at 100° F.—62.4 centistokes.
Viscosity of blend at 210° F.—10.88 centistokes.
Viscosity index of blend—144.
Thickening power of polymer at 100° F.—16.5.
Thickening power of polymer at 210° F.—16.5.
Relative thickening power of polymer—1.0.

EXAMPLE 27

In this example, 1-butene was polymerized under the following reaction conditions:

Temperature— —35.5° C.
Ratio of promoter to catalyst—1.43 moles of HBr per mole of $AlBr_3$.
Rate of addition of olefin—0.196 mole of 1-butene per mole of $AlBr_3$ per minute.
Ratio of olefin to catalyst—19.6 moles of 1-butene per mole of $AlBr_3$.

The polymer product obtained was admixed in the amount of 2% by weight with a neutral lubricating oil base stock having a viscosity at 210° F. of 4.54 centistokes and a viscosity index of 114. The resulting blend had a viscosity at 210° F., of 13.05 centistokes and a viscosity index of 149.7. The polymer product had the following characteristics:

$TP_{210} = 22.9$
$TP_{100} = 22.8$
$RTP = 1.0$

EXAMPLE 28

In this example, 1-pentene was polymerized as described in connection with the previous examples. The reaction conditions were:

Temperature— —1.5° C.
Ratio of promoter to catalyst—1.51 moles of HBr per mole of $AlBr_3$.
Rate of addition of olefin—0.252 mole of 1-pentene per mole of $AlBr_3$ per minute.
Ratio of olefin to catalyst—53.2 moles of 1-pentene per mole of $AlBr_3$.

The polymer product was admixed with a lubricating oil base stock as in Example 27. The viscosities and viscosity index of the blend and the thickening process of the polymer products are as follows:

Viscosity of blend at 100° F.—35.09 centistokes.
Viscosity of blend at 210° F.—6.38 centistokes.
Viscosity index of blend—138.
Thickening power of polymer at 100° F.—8.18.
Thickening power of polymer at 210° F.—7.40.
Relative thickening power—0.91.

EXAMPLES 29 TO 32

In these examples, 1-octene was polymerized in the same manner as described in connection with the previous examples. The polymer product was admixed with a lubricating oil base stock as in Example 27. The reaction conditions, the viscosities and viscosity indices of the blends, and the thickening process of the polymer products are listed in Table V.

*Table V*

| Example No. | 29 | 30 | 31 | 32 |
|---|---|---|---|---|
| Temperature, °C. | 0 | 0 | 0 | 0 |
| Ratio of Promoter to Catalyst, Moles of HBr per mole of $AlBr_3$ | 1.53 | 1.50 | 1.50 | 1.50 |
| Rate of Addition of Olefin, Moles 1-octene per mole of $AlBr_3$ per minute | 0.192 | 0.201 | 0.177 | 0.196 |
| Ratio of Olefin to Catalyst, Moles of 1-octene per mole of $AlBr_3$ | 23.0 | 28.8 | 18.6 | 13.6 |
| Viscosity of Blend at 100° F., Centistokes | 44.2 | 41.0 | 35.0 | 47.8 |
| Viscosity of Blend at 210° F., Centistokes | 8.48 | 7.64 | 6.50 | 8.77 |
| Viscosity Index of Blend | 149 | 145 | 141 | 146 |
| Thickening power of Polymer at 100° F. | 13.2 | 11.5 | 8.1 | 14.9 |
| Thickening power of Polymer at 210° F. | 13.6 | 11.3 | 7.8 | 14.3 |
| Relative Thickening Power | 1.03 | 0.98 | 0.96 | 0.96 |

EXAMPLES 33 TO 35

In these examples, 1-decene (Example 33), 1-dodecene (Example 34), and 1-cetene (Example 35) were polymerized in the same manner as described in connection with the previous examples. The polymer product was admixed with a lubricating oil base stock similarly as in Example 27. The table lists the reaction conditions, the viscosities and viscosity indices of the blends, and the thickening powers of the polymer products.

*Table VI*

| Example No. | 33 | 34 | 35 |
|---|---|---|---|
| Temperature, °C. | 0 | 0 | 0 |
| Ratio of Promoter to Catalyst, Moles of HBr per mole of $AlBr_3$ | 150 | 150 | 150 |
| Rate of Addition of Olefin, Moles of Olefin per Mole of $AlBr_3$ per minute | 0.195 | 0.195 | 0.180 |
| Ratio of Olefin to Catalyst, Moles of Olefin per Mole of $AlBr_3$ | 46.8 | 46.8 | 13.5 |
| Viscosity of Blend at 100° F., Centistokes | 39.3 | 40.7 | 37.5 |
| Viscosity of Blend at 210° F., Centistokes | 7.36 | 7.84 | 7.16 |
| Viscosity Index of Blend | 145 | 149 | 147 |
| Thickening Power of Polymer at 100° F. | 10.6 | 11.4 | 9.6 |
| Thickening Power of Polymer at 210° F. | 10.5 | 11.9 | 9.9 |
| Relative Thickening Power | 0.99 | 1.04 | 1.03 |

EXAMPLE 36

In this example, a mixture of olefins was polymerized in the same manner as hereinbefore described. The mixture contained the following components in volume per cent:

30% 1-octene
20% 1-decene
20% 1-dodecene
10% 1-tetradecene
10% 1-hexadecene
10% 1-octadecene The polymer product was admixed with a lubricating oil base stock as described in Example 27.

Table VII gives reaction conditions, viscosities and viscosity index of the blend, and the thickening powers of the polymer product.

Table VII

| | |
|---|---|
| Temperature, °C | 0°C. |
| Ratio of Promoter to Catalyst, Moles of HBr per mole of AlBr$_3$ | 1.5 |
| Rate of Addition of Olefin, Moles of Olefin per mole of AlBr$_3$ per minute | .188 |
| Ratio of Olefin to Catalyst, Moles of Olefin per mole of AlBr$_3$ | 22.7 |
| Viscosity of Blend at 100° F., Centistokes | 34.4 |
| Viscosity of Blend at 210° F., Centistokes | 6.40 |
| Viscosity Index of Blend | 141 |
| Thickening Power of Polymer at 100° F | 7.7 |
| Thickening Power of Polymer at 210° F | 7.5 |
| Relative Thickening Power | 0.97 |

Having thus described our invention, it is to be understood that such description has been given by way of illustration and example only and not by way of limitation, reference for the latter purpose being had to the appended claims.

We claim:

1. A process for effecting the polymerization of an olefin having the formula $$R-CH=CH_2$$

wherein R is an alkyl group having at least two carbon atoms, which comprises contacting said olefin with aluminum bromide catalyst dissolved in a non-polymerizing hydrocarbon solvent, in a polymerization reaction zone, in the presence of hydrogen bromide, in proportions such that, during the course of the reaction in said polymerization reaction zone, the mole ratio of hydrogen bromide to dissolved aluminum bromide will be between about 0.05 and 1.6 and the rate of addition of olefin to dissolved aluminum bromide will be not greater than about 4 moles per mole of dissolved aluminum bromide per minute.

2. A process for effecting the polymerization of an olefin having the formula $$R-CH=CH_2$$

wherein R is an alkyl group having at least two carbon atoms, which comprises contacting said olefin, aluminum bromide catalyst dissolved in a non-polymerizing hydrocarbon solvent, and hydrogen bromide in a polymerization reaction zone, in proportions such that, during the course of the reaction in said polymerization reaction zone, the mole ratio of hydrogen bromide to dissolved aluminum bromide will be between about 0.08 and 1.2, the rate of addition of olefin to dissolved aluminum bromide will be not greater than about 2.5 moles per mole of dissolved aluminum bromide per minute, and the amount of olefin will be between about 10 and 90 moles per mole of dissolved aluminum bromide.

3. A process for effecting the polymerization of 1-butene, which comprises contacting said 1-butene, aluminum bromide catalyst dissolved in a non-polymerizing hydrocarbon solvent, and hydrogen bromide in a polymerization reaction zone, in proportions such that, during the course of the reaction in said polymerization reaction zone, the mole ratio of hydrogen bromide to dissolved aluminum bromide will be between about 0.05 and 1.6, the rate of addition of 1-butene to dissolved aluminum bromide will be not greater than about 4 moles per mole of dissolved aluminum bromide per minute, and the amount of 1-butene will be between about 5 and 90 moles per mole of dissolved aluminum bromide, and maintaining said polymerization reaction zone at a temperature of between about $-10°$ C. and $-45°$ C.

4. The process of claim 3 wherein the temperature is between about $-25°$ C. and $-40°$ C.

5. The process of claim 3 wherein the temperature is about $-35°$ C.

6. A process for effecting the polymerization of 1-pentene, which comprises contacting said 1-pentene, aluminum bromide catalyst dissolved in a non-polymerizing hydrocarbon solvent, and hydrogen bromide in a polymerization reaction zone, in proportions such that, during the course of the reaction in said polymerization reaction zone, the mole ratio of hydrogen bromide to dissolved aluminum bromide will be between about 0.05 and 1.6, the rate of addition of 1-pentene to dissolved aluminum bromide will be not greater than about 4 moles per mole of dissolved aluminum bromide per minute, and the amount of 1-pentene will be between about 5 and 90 moles per mole of dissolved aluminum bromide, and maintaining said polymerization reaction zone at a temperature of between about 0° C. and $-40°$ C.

7. The process of claim 6 wherein the temperature is between about $-15°$ C. and $-35°$ C.

8. The process of claim 6 wherein the temperature is about $-30°$ C.

9. A process for effecting the polymerization of an olefin having the formula $$R-CH=CH_2$$

wherein R is an alkyl group having at least two carbon atoms, which comprises adding said olefin to aluminum bromide dissolved in a non-polymerizing hydrocarbon solvent at a rate not greater than about 4 moles of olefin per mole of dissolved aluminum bromide per minute and in an amount of between about 5 and 90 moles of olefin per mole of dissolved aluminum bromide, said dissolved aluminum bromide containing hydrogen bromide in an amount of between about 0.05 and 1.6 moles per mole of dissolved aluminum bromide.

10. A process for effecting the polymerization of an olefin having the formula $$R-CH=CH_2$$

wherein R is an alkyl group having at least two carbon atoms, which comprises adding said olefin to aluminum bromide dissolved in a non-polymerizing hydrocarbon solvent at a rate not greater than about 2.5 moles of olefin per mole of dissolved aluminum bromide per minute and in an amount of between about 20 and 75 moles of olefin per mole of dissolved aluminum bromide, said dissolved aluminum bromide containing hydrogen bromide in an amount of between about 0.08 and 1.2 moles per mole of dissolved aluminum bromide.

11. A polymer of an olefin having the formula $$R-CH=CH_2$$

wherein R is an alkyl group having at least two carbon atoms, obtained by the process which comprises adding said olefin to aluminum bromide dissolved in a non-polymerizing hydrocarbon solvent at a rate not greater than about 4 moles of olefin per mole of dissolved aluminum bromide per minute and in an amount of between about 5 and 90 moles of olefin per mole of dissolved aluminum bromide, said dissolved aluminum bromide containing hydrogen bromide in an amount of between about 0.05 and 1.6 moles per mole of dissolved aluminum bromide, and said polymer having a thickening power at 210° F., obtained from the formula:

$$TP_{210} = \frac{100}{\% \text{ polymer in blend}} \log_{10} \frac{\text{kinematic viscosity of oil blend}}{\text{kinematic viscosity of base oil}}$$

wherein $TP_{210}$ = thickening power at 210° F.;

% polymer in blend = the per cent by weight of the polymer blended with a base stock lubricating oil;

Kinematic viscosity of oil blend = the viscosity in centistokes of the blend of base stock lubricating oil and polymer at 210° F.; and Kinematic viscosity of base oil = the viscosity in centistokes of the base stock lubricating oil at 210° F., in excess of 5.

12. A polymer of butene-1 obtained by the process which comprises adding said butene-1 to aluminum bromide dissolved in a non-polymerizing hydrocarbon solvent at a rate not greater than about 4 moles of butene-1 per mole of dissolved aluminum bromide per minute and in an amount of between about 5 and 90 moles of butene-1 per mole of dissolved aluminum bromide, at a temperature of between about −25° C. and −40° C., said dissolved aluminum bromide containing hydrogen bromide in an amount of between about 0.05 and 1.6 moles per mole of dissolved aluminum bromide, and said polymer having a thickening power at 210° F., obtained from the formula:

$$TP_{210} = \frac{100}{\% \text{ polymer in blend}} \log_{10} \frac{\text{kinematic viscosity of oil blend}}{\text{kinematic viscosity of base oil}}$$

wherein $TP_{210}$ = thickening power at 210° F.;

% polymer in blend = the per cent by weight of the polymer blended with a base stock lubricating oil;

Kinematic viscosity of oil blend = the viscosity in centistokes of the blend of base stock lubricating oil and polymer at 210° F.; and Kinematic viscosity of base oil = the viscosity in centistokes of the base stock lubricating oil at 210° F., of between 5 and 23.

13. A polymer of pentene-1 obtained by the process which comprises adding said pentene-1 to aluminum bromide dissolved in a non-polymerizing hydrocarbon solvent at a rate not greater than about 4 moles of pentene-1 per mole of dissolved aluminum bromide per minute and in an amount of between about 5 and 90 moles of pentene-1 per mole of dissolved aluminum bromide, at a temperature of between about 0° C. and −40° C., said dissolved aluminum bromide containing hydrogen bromide in an amount of between about 0.05 and 1.6 moles per mole of dissolved aluminum bromide, and said polymer having a thickening power at 210° F., obtained from the formula:

$$TP_{210} = \frac{100}{\% \text{ polymer in blend}} \log_{10} \frac{\text{kinematic viscosity of oil blend}}{\text{kinematic viscosity of base oil}}$$

wherein $TP_{210}$ = thickening power at 210° F.;

% polymer in blend = the per cent by weight of the polymer blended with a base stock lubricating oil;

Kinematic viscosity of oil blend = the viscosity in centistokes of the blend of base stock lubricating oil and polymer at 210° F.; and Kinematic viscosity of base oil = the viscosity in centistokes of the base stock lubricating oil at 210° F., of between 5 and 23.

14. A polymer of octene-1 obtained by the process which comprises adding said octene-1 to aluminum bromide dissolved in a non-polymerizing hydrocarbon solvent at a rate not greater than about 4 moles of octene-1 per mole of dissolved aluminum bromide per minute and in an amount of between about 5 and 90 moles of octene-1 per mole of dissolved aluminum bromide, at a temperature of between about 20° C. and −35° C., said dissolved aluminum bromide containing hydrogen bromide in an amount of between about 0.05 and 1.6 moles per mole of dissolved aluminum bromide, and said polymer having a thickening power at 210° F., obtained from the formula:

$$TP_{210} = \frac{100}{\% \text{ polymer in blend}} \log_{10} \frac{\text{kinematic viscosity of oil blend}}{\text{kinematic viscosity of base oil}}$$

wherein $TP_{210}$ = thickening power at 210° F.;

% polymer in blend = the per cent by weight of the polymer blended with a base stock lubricating oil;

Kinematic viscosity of oil blend = the viscosity in centistokes of the blend of base stock lubricating oil and polymer at 210° F.; and Kinematic viscosity of base oil = the viscosity in centistokes of the base stock lubricating oil at 210° F., of between 5 and 23.

15. A mineral lubricating oil containing a minor proportion, sufficient to improve the viscosity index thereof, of a polymer of an olefin having the formula

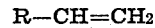

$$R\text{---}CH=CH_2$$

wherein R is an alkyl group having at least two carbon atoms, obtained by the process which comprises adding said olefin to aluminum bromide dissolved in a non-polymerizing hydrocarbon solvent at a rate not greater than about 4 moles of olefin per mole of dissolved aluminum bromide per minute and in an amount of between about 5 and 90 moles of olefin per mole of dissolved aluminum bromide, said dissolved aluminum bromide containing hydrogen bromide in an amount of between about 0.05 and 1.6 moles per mole of dissolved aluminum bromide, and said polymer having a thickening power at 210° F., obtained from the formula:

$$TP_{210} = \frac{100}{\% \text{ polymer in blend}} \log_{10} \frac{\text{kinematic viscosity of oil blend}}{\text{kinematic viscosity of base oil}}$$

wherein

TP$_{210}$=thickening power at 210° F.;

% polymer in blend=the per cent by weight of the polymer blended with a base stock lubricating oil;

Kinematic viscosity of oil blend=the viscosity in centistokes of the blend of base stock lubricating oil and polymer at 210° F.; and Kinematic viscosity of base oil=the viscosity in centistokes of the base stock lubricating oil at 210° F., in excess of 5.

16. A mineral lubricating oil containing a minor proportion, sufficient to improve the viscosity index thereof, of a polymer of butene-1 obtained by the process which comprises adding said butene-1 to aluminum bromide dissolved in a non-polymerizing hydrocarbon solvent at a rate not greater than about 4 moles of butene-1 per mole of dissolved aluminum bromide per minute and in an amount of between about 5 and 90 moles of butene-1 per mole of dissolved aluminum bromide, at a temperature of between about −25° C. and −40° C., said dissolved aluminum bromide containing hydrogen bromide in an amount of between about 0.05 and 1.6 moles per mole of dissolved aluminum bromide, and said polymer having a thickening power at 210° F., obtained from the formula:

$$TP_{210} = \frac{100}{\% \text{ polymer in blend}} \log_{10} \frac{\text{kinematic viscosity of oil blend}}{\text{kinematic viscosity of base oil}}$$

wherein

TP$_{210}$=thickening power at 210° F.;

% polymer in blend=the per cent by weight of the polymer blended with a base stock lubricating oil;

Kinematic viscosity of oil blend=the viscosity in centistokes of the blend of base stock lubricating oil and polymer at 210° F.; and Kinematic viscosity of base oil=the viscosity in centistokes of the base stock lubricating oil at 210° F., of between 5 and 23.

17. A mineral lubricating oil containing a minor proportion, sufficient to improve the viscosity index thereof, of a polymer of pentene-1 obtained by the process which comprises adding said pentene-1 to aluminum bromide dissolved in a non-polymerizing hydrocarbon solvent at a rate not greater than about 4 moles of pentene-1 per mole of dissolved aluminum bromide per minute and in an amount of between about 5 and 90 moles of pentene-1 per mole of dissolved aluminum bromide, at a temperature of between about 0° C. and −40° C., said dissolved aluminum bromide containing hydrogen bromide in an amount of between about 0.05 and 1.6 moles per mole of dissolved aluminum bromide, and said polymer having a thickening power at 210° F., obtained from the formula $$TP_{210} = \frac{100}{\% \text{ polymer in blend}} \log_{10} \frac{\text{kinematic viscosity of oil blend}}{\text{kinematic viscosity of base oil}}$$

wherein

TP$_{210}$=thickening power at 210° F.;

% polymer in blend=the per cent by weight of the polymer blended with a base stock lubricating oil;

Kinematic viscosity of oil blend=the viscosity in centistokes of the blend of base stock lubricating oil and polymer at 210° F.; and Kinematic viscosity of base oil=the viscosity in centistokes of the base stock lubricating oil at 210° F., of between 5 and 23.

18. A mineral lubricating oil containing a minor proportion, sufficient to improve the viscosity index thereof, of a polymer of octene-1 obtained by the process which comprises adding said octene-1 to aluminum bromide dissolved in a non-polymerizing hydrocarbon solvent at a rate not greater than about 4 moles of octene-1 per mole of dissolved aluminum bromide per minute and in an amount of between about 5 and 90 moles of octene-1 per mole of dissolved aluminum bromide, at a temperature of between about 20° C. and −35° C., said dissolved aluminum bromide containing hydrogen bromide in an amount of between about 0.05 and 1.6 moles per mole of dissolved aluminum bromide, and said polymer having a thickening power at 210° F., obtained from the formula:

$$TP_{210} = \frac{100}{\% \text{ polymer in blend}} \log_{10} \frac{\text{kinematic viscosity of oil blend}}{\text{kinematic viscosity of base oil}}$$

wherein

TP$_{210}$=thickening power at 210° F.;

% polymer in blend=the per cent by weight of the polymer blended with a base stock lubricating oil;

Kinematic viscosity of oil blend=the viscosity in centistokes of the blend of base stock lubricating oil and polymer at 210° F.; and Kinematic viscosity of base oil=the viscosity in centistokes of the base stock lubricating oil at 210° F., of between 5 and 23.

CELESTE M. FONTANA.
GLENN A. KIDDER.

REFERENCES CITED

The following references are of record in the file of this patent:

UNITED STATES PATENTS

| Number | Name | Date |
|---|---|---|
| 2,243,658 | Thomas | May 27, 1941 |
| 2,387,784 | Thomas | Oct. 30, 1945 |
| 2,401,933 | Hershberger | June 11, 1946 |
| 2,410,885 | Lieber | Nov. 12, 1946 |
| 2,471,890 | Palmer | May 31, 1949 |
| 2,474,670 | Hershberger | June 28, 1949 |

FOREIGN PATENTS

| Number | Country | Date |
|---|---|---|
| 565,974 | Great Britain | Dec. 7, 1944 |